(12) United States Patent
Erdmann et al.

(10) Patent No.: US 9,783,679 B2
(45) Date of Patent: Oct. 10, 2017

(54) MICROSTRUCTURED COMPOSITE MATERIAL, METHOD FOR THE PRODUCTION THEREOF, MOULDED ARTICLES MADE THEREOF AND ALSO PURPOSES OF USE

(71) Applicant: FRAUNHOFER-GESELLSCHAFT ZUR FÖRDERUNG DER ANGEWANDTEN FORSCHUNG E.V., München (DE)

(72) Inventors: Jens Erdmann, Berlin (DE); Gunnar Engelmann, Potsdam (DE); Johannes Ganster, Potsdam (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 0 days.

(21) Appl. No.: 14/766,942

(22) PCT Filed: Jan. 9, 2014

(86) PCT No.: PCT/EP2014/050256
§ 371 (c)(1),
(2) Date: Aug. 10, 2015

(87) PCT Pub. No.: WO2014/121967
PCT Pub. Date: Aug. 14, 2014

(65) Prior Publication Data
US 2016/0002466 A1    Jan. 7, 2016

(30) Foreign Application Priority Data
Feb. 11, 2013    (DE) .................. 10 2013 002 574

(51) Int. Cl.
*C08L 97/00* (2006.01)
*B29C 43/00* (2006.01)
(Continued)

(52) U.S. Cl.
CPC .......... *C08L 97/005* (2013.01); *B29C 43/003* (2013.01); *B29C 43/24* (2013.01);
(Continued)

(58) Field of Classification Search
CPC .... C08L 97/005; C08L 23/06; C08L 2205/22; C08L 2205/03; B29C 47/0059;
(Continued)

(56) References Cited

U.S. PATENT DOCUMENTS

| 6,509,397 B1 | 1/2003 | Nägele et al. |
| 2011/0274612 A1 | 11/2011 | Wohlmann et al. |
| 2016/0002467 A1 | 1/2016 | Erdmann et al. |

FOREIGN PATENT DOCUMENTS

| DE | 198 52 067 A1 | 5/2000 |
| DE | 198 52 081 C1 | 7/2000 |

(Continued)

OTHER PUBLICATIONS

Sailaja et al. "Mechanical and thermal properties of compatibilized composites of polyethylene and esterified lignin", Materials and Design, 31, (2010), 4369-4379.*

(Continued)

*Primary Examiner* — Ling Choi
*Assistant Examiner* — Ronald Grinsted
(74) *Attorney, Agent, or Firm* — Leydig, Voit & Mayer, Ltd.

(57) ABSTRACT

Microstructured composite material, comprising a matrix, comprising at least one sort of a thermoplastic plastic material and, distributed homogenously in the matrix, at least one sort of lignin and/or at least one lignin derivative, (Continued)

characterized in that the at least one sort of lignin and/or at least one lignin derivative is present in particulate form and the cross-sectional area of the particles has a round, approximately round, circular, approximately circular, elliptical or approximately elliptical geometry.

18 Claims, 6 Drawing Sheets

(51) Int. Cl.
    *B29C 43/24*      (2006.01)
    *B29C 45/00*      (2006.01)
    *B29C 47/00*      (2006.01)
    *B29C 47/06*      (2006.01)
    *B29C 51/00*      (2006.01)
    *C08L 23/06*      (2006.01)
    *B29C 70/58*      (2006.01)
    *C08J 5/04*      (2006.01)
    *C08G 18/64*      (2006.01)
    *B29C 49/00*      (2006.01)
    *B29L 31/30*      (2006.01)
    *B29K 105/16*      (2006.01)
    *B29K 511/00*      (2006.01)
    *B29L 31/34*      (2006.01)
    *B29L 31/00*      (2006.01)

(52) U.S. Cl.
CPC ...... *B29C 45/0001* (2013.01); *B29C 45/0013* (2013.01); *B29C 47/0004* (2013.01); *B29C 47/0059* (2013.01); *B29C 47/06* (2013.01); *B29C 49/0005* (2013.01); *B29C 49/0015* (2013.01); *B29C 51/002* (2013.01); *B29C 70/58* (2013.01); *C08G 18/6492* (2013.01); *C08J 5/045* (2013.01); *C08L 23/06* (2013.01); *B29K 2023/04* (2013.01); *B29K 2105/16* (2013.01); *B29K 2511/00* (2013.01); *B29L 2031/30* (2013.01); *B29L 2031/3055* (2013.01); *B29L 2031/34* (2013.01); *B29L 2031/712* (2013.01); *B29L 2031/762* (2013.01); *C08J 2323/06* (2013.01); *C08L 2205/03* (2013.01); *C08L 2205/22* (2013.01)

(58) Field of Classification Search
CPC . B29C 47/0004; B29C 45/0001; B29C 43/24; B29C 49/0005; B29C 45/0013; B29C 47/06; B29C 43/003; B29C 49/0015
USPC .......................................................... 524/76
See application file for complete search history.

(56) References Cited

FOREIGN PATENT DOCUMENTS

| | | | |
|---|---|---|---|
| DE | 10 2010 052878 A1 | 6/2012 | |
| FR | 2 932 490 A1 | 12/2009 | |
| JP | 2011-219716 A | 11/2011 | |
| RU | 2003 124410 A | 3/2005 | |
| WO | WO 96/38494 | * 12/1996 | |
| WO | WO 96/38494 A1 | 12/1996 | |
| WO | WO 00/27923 A1 | 5/2000 | |
| WO | WO 2010/081775 A1 | 7/2010 | |
| WO | WO 2012/088711 A1 | 7/2012 | |
| WO | WO 2014/122089 A1 | 8/2014 | |

OTHER PUBLICATIONS

Sigma-Aldrich "Product 188050—Polyethylene Maleic Anhydride", (www.sigmaaldrich.com)—Downloaded Nov. 30, 2016.*
Sigma-Aldrich "Alkali Lignin, Organosolv Lignin, Hydrolytic Lignin", (www.sigmaaldrich.com)—Downloaded Nov. 27, 2016.*
Wenzl, H. ,"The Chemical Technology of Wood", Elsevier 2012, p. 101.*
Diffen—"Hardwood vs. Softwood", (www.diffen.com/difference/Hardwood_vs_Softwood) Downloaded—Nov. 28, 2016.*
European Patent Office, Notice Pursuant to Article 94(3) EPC in European Patent Application No. 14 700 176.2 (Jul. 20, 2016).
Nitz et al., "Influence of Lignin Type on the Mechanical Properties of Lignin Based Compounds," *Macromolecular Materials and Engineering*, 286(12): 737-743 (2001).
European Patent Office, International Search Report in International Application No. PCT/EP2014/050256 (Apr. 16, 2014).
European Patent Office, Written Opinion in International Application No. PCT/EP2014/050256 (Apr. 16, 2014).
International Bureau of WIPO, International Preliminary Report on Patentability in International Application No. PCT/EP2014/050256 (Aug. 13, 2015).
Grobelny et al., "High-resolution solid-state carbon-13 nuclear magnetic resonance study of polybenzimidazole/polyimide blends," *Macromolecules* 23(8): 2139-2144 (1990).
Kaplan, "Structure—property relationships in copolymers to composites: Molecular interpretation of the glass transition phenomenon," *Journal of Appl. Polym. Sci.*, 20(10): 2615-2629 (1976).
Kubo et al., "Poly(ethylene Oxide)/Organosolv Lignin Blends," *Macromolecules* 37: 6904-6911 (2004).
Luo et al., "Effect of Compatibilizers on the Mechanical Properties of Low Density Polyethylene/Lignin Blends," *Chinese Journal of Polymer Science*, vol. 27, No. 6, pp. 833-842, (2009).
LV et al., Effect of PP-G-MAH on the Compatibility of Lignin/LDPE Composites, *Advanced Materials Research*, vols. 194-196, pp. 1476-1479 (2011).
Masson et al., "Cellulose/Poly(4-vinylpyridine) Blends," *Macromolecules*, 24(22): 5914-5921 (1991).
Nishio, "Chapter 5—Hyperfine Composites of Cellulose with Synthetic Polymers," *Cellulosic Polymers, Blends, and Composites*, Gilbert R.D., Ed., Hanser: Munich, New York, pp. 95-113 (1994).
Thring et al., "Polyurethanes From Alcell Lignin," *Biomass and Bioenergy*, vol. 13, No. 3, pp. 125-132, (1997).
Zhang et al., "High-resolution solid-state $^{13}$C nuclear magnetic resonance study on poly(vinyl alcohol)/poly(vinylpyrrolidone) blends," *Polymer*, 33(4): 712-717 (1992).
Canetti et al., "Thermal degradation behaviour of isotactic polypropylene blended with lignin," *Polym. Deg. Stab.*, vol. 91, No. 3, pp. 494-498 (2006).
Cazacu et al., "Lignin role in a complex polyolefin blend," *Industrial Crops and Products, 6th International Lignin Institute conference*, vol. 20, Issue 2, pp. 261-273 (2004).
Sailaja et al., "Mechanical and thermal properties of compatibilized composites of polyethylene and esterified lignin," *Materials and Design (Impact Factor: 3.5)* 31(9):4369-4379 (2010).
"Experimental," Excerpt from p. 205, *Proceedings of Recent Advances in Polymers and Composites, Proceedings of the Symposium, Macro 2000*, Kanpur (Dec. 1-2, 2000).
Dafader, "Effect of Monomer Concentration on the Degree of Grafting and Mechanical Properties of Grafted Rubber Film," Internal Report, Institute of Nuclear Science Technology Atomic Energy Research Establishment, Bangladesh, http://www.iaea.org/inis/collection/NCLCollectionStore/Public/36/008/36008637.pdf 10 pgs. (2003).

* cited by examiner

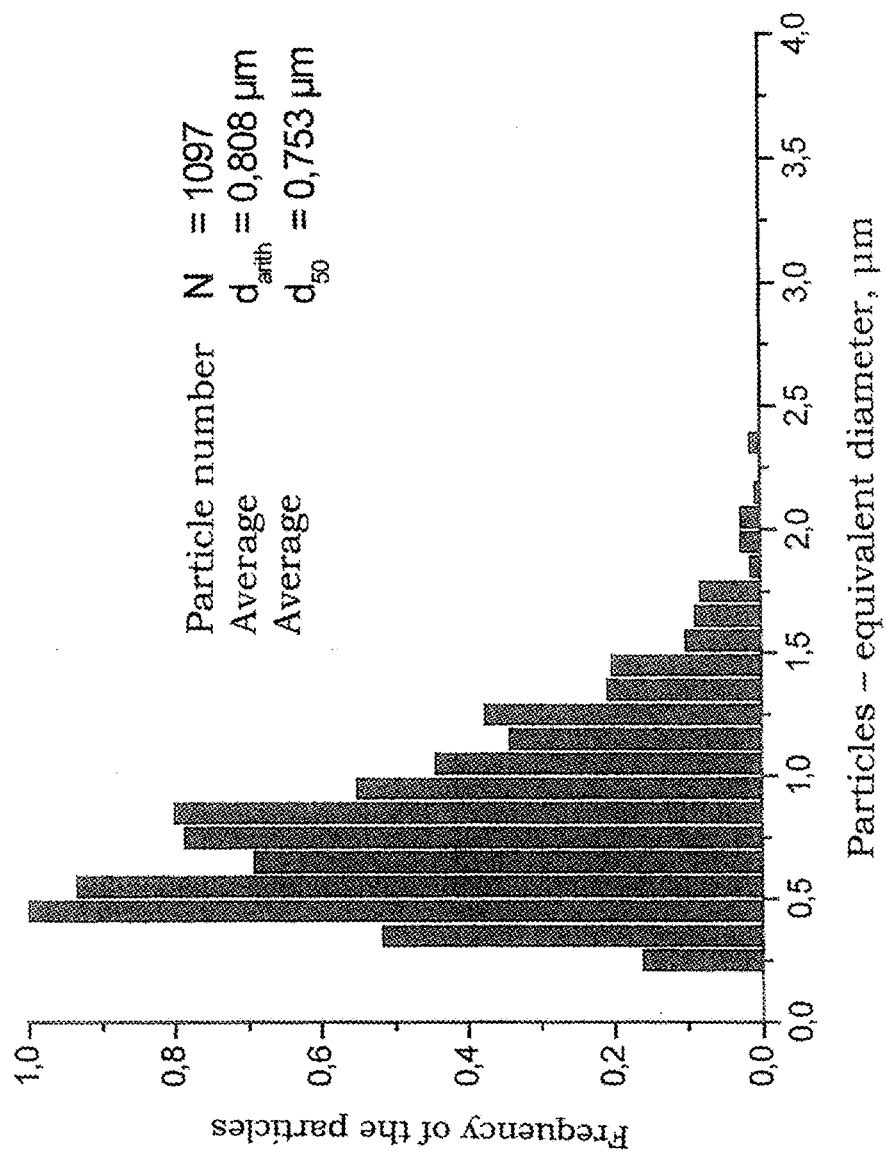

MICROSTRUCTURED COMPOSITE MATERIAL, METHOD FOR THE PRODUCTION THEREOF, MOULDED ARTICLES MADE THEREOF AND ALSO PURPOSES OF USE

CROSS-REFERENCE TO RELATED APPLICATIONS

This patent application is the U.S. national phase of International Application No. PCT/EP2014/050256, filed on Jan. 9, 2014, which claims the benefit of German Patent Application No. 10 2013 002 574.5, filed Feb. 11, 2013, the disclosures of which are incorporated herein by reference in their entireties for all purposes.

The present invention relates to a microstructured composite material, the continuous matrix of a thermoplastic plastic material of which comprises a lignin or lignin derivative in particulate form (filler). The lignin or lignin derivative embedded in the thermoplastic plastic material is characterised in particular in that it has a circular or elliptical cross-sectional geometry, the diameters or semiaxes of the mentioned cross-sections being in a range of 0.1 μm to 10 μm. Furthermore, the thermoplastic plastic material can comprise various additives or further thermoplastic plastic materials, preferably at least one adhesive is contained for increasing the compatibility between the thermoplastic plastic material and the lignin or lignin-derivative particles.

Because of the increasing shortage of petroleum and the continuous petroleum price increase accompanying this, biopolymers or biomaterials, i.e. materials based on renewable raw materials, increasingly are arousing great interest in various branches of industry, not least because of the inexhaustible availability. One strategic goal is to develop technical applications for biomaterials and, in the long term, to substitute technical petroleum-based polymer blends at least partially.

Together with cellulose, lignin forms the main component of wood, a lignin content of 25% to 30% being assumed for coniferous wood and between 18% to 24% for deciduous wood. Hence, there is an annually renewable quantity of 75 billion tonnes of lignin. Around 50 million tonnes thereof are produced industrially. This quantity occurs mainly as a by-product in wood pulping for cellulose production in more or less modified form in waste lyes (black lye). At the present time, the waste lyes and the lignin contained therein are predominantly combusted and used thermally for energy production. In addition to thermal use, increasingly also the material utilisation of lignin is becoming the focus of interest. Essentially three application fields have thereby emerged:

a) With vanillin, a high-quality, molecular flavouring is obtained from lignin both chemically and biochemically.
b) Lignosulphonates, polymer compounds based on lignin (sulphite processes) are used, because of their special solubility properties in water, for various applications in the field of dyeing works (mineral dyes) or tanneries or as paper additives, as additives in construction (concrete, bricks, chipboard, dust-bonding agents, plaster) or as a component in pelletising means (animal feed, briquettes) and detergents (drilling muds).
c) Lignin as low-cost filler or formulation component in thermoplastic polymer materials or in synthetic epoxy resins which can be used for the production of moulded parts by extrusion, injection moulding, pressing, rapid transfer moulding. According to the property profile of the composite materials, applications result for components in automobile construction, transport- and plant construction, household appliances (housings), containers, devices for medical technology, electrics and/or electronics.

The use of lignin as filler in thermoplastic polymer materials/plastic materials is the subject of numerous publications. The focus here is orientated towards mass plastic materials, polyethylene (PE), polypropylene (PP) and polyvinyl chloride (PVC) as matrix. It stands central to scientific discussions, to what degree a) the lignin properties themselves (influenced by origin of the lignin: plant type, location, pulping process, derivatisation/modification/functionalisation) and
b) the interaction between filler and matrix influence the resulting composite properties. It is thereby shown that lignins which originate in the kraft process or from various organosolv processes are well suited for thermoplastic processing. This applies both for thermoplastics with lignin as filler or as matrix (DE 198 520 67 A1). With respect to the lignin modification/derivatisation, there have proved to be advantageous epoxy-modified lignosulphonates (Cazacu G, Pascu M C, Profire L, Kowarski Al, Mihaes M, Vasile C: Lignin role in a complex polyolefin blend, Ind. Crops Prod. 20 (2004) 261-273 and lignin phthalate (Sailaja R R N, Deepthi M V: mechanical and thermal properties of compatibilized composites of polyethylene and esterified lignin, Mat. Design 31 (2010) 4369-4379) in combination with a polyolefinic matrix. Improving the compatibility or the adhesion between thermoplastic matrix and lignin particles has to date been identified as the dominating positive influence factor on the resulting composite properties.

All these approaches for a solution have however in common that the use of lignin/lignin derivatives in fact involves an increase in the composite rigidity (modulus of elasticity), however, at the same time, accompanied by a dramatic reduction in strength, breaking elongation and impact strength. The effect of the material brittleness increases dramatically in particular with higher lignin contents (>20% by mass).

Without the addition of a) reinforcing fibres (cost-intensive, wear of the processing machines) or b) plasticisers (migration, reduction in strength and rigidity), which however involves significant disadvantages, composite materials with higher lignin contents are at present not marketable.

The use of lignin as filler in thermoplastic polymer materials in fact, in most cases, causes an increase in the composite rigidity, however is accompanied by a dramatic reduction in strength, breaking elongation and impact strength. The effect of the material embrittlement increases dramatically in particular with higher lignin contents and can only be compensated for by using reinforcing fibres or plasticisers. This form of additivation is however very complex and cost-intensive and goes against the approach of reducing the overall material costs with lignin as low-cost filler and polymer substituent.

It is therefore the goal to provide a composite material which, preferably with as high a lignin content as possible (e.g. >50% by mass), achieves at least the mechanical property levels of the unfilled matrix, the properties of strength and impact strength being of superior importance.

This object is achieved, with respect to a microstructured composite material, by the features of patent claim 1, with respect to a method for the production of the composite material, by the features of patent claim 15, with respect to a moulded article, a granulate or a master batch made of the composite material according to the invention, by the features of patent claim 17 and also, with respect to the purposes of use of the composite material or of the moulded parts, by the features of patent claim 18. The respectively dependent patent claims thereby represent advantageous developments.

BRIEF DESCRIPTION OF THE DRAWINGS

FIG. 1b illustrates the measurement of a representative number of cavities produced in the composite of FIG. 1a.

FIG. 2b illustrates the measurement of a representative number of cavities produced in the composite of FIG. 2a.

FIG. 3b illustrates the measurement of a representative number of cavities produced in the composite of FIG. 3a.

Figure 1A:
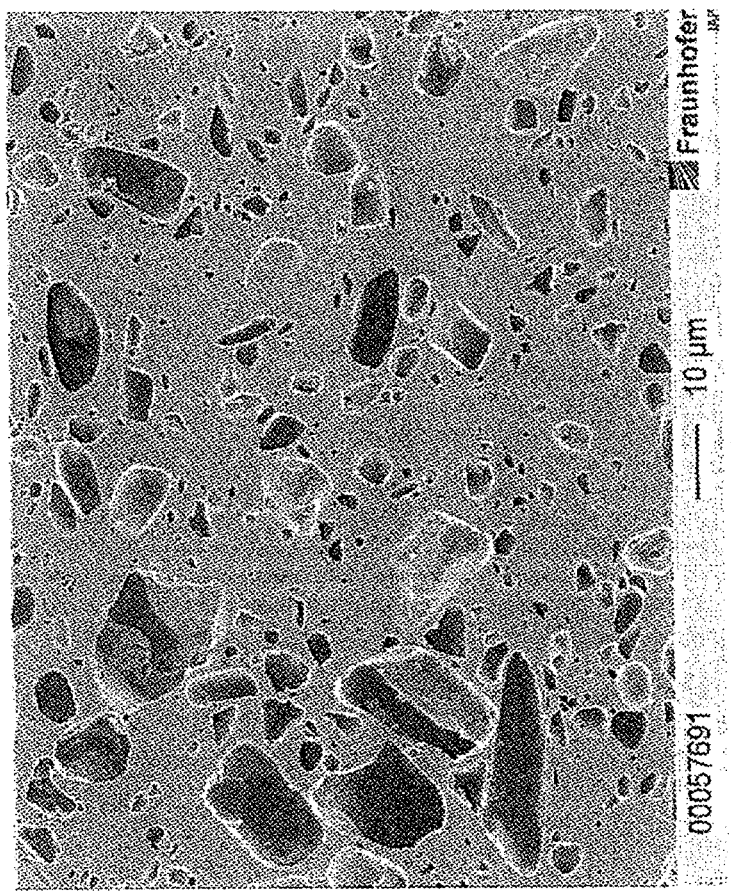
FIG. 1a is a scanning electron microscopic image of the cross-section of a composite material consisting of polyethylene, adhesive and 50% lignin.

According to the invention, a microstructured composite material is hence indicated, comprising
a) a matrix, comprising at least one sort of a thermoplastic plastic material, and
b) distributed homogeneously in the matrix, at least one sort of lignin and/or at least one lignin derivative,
the at least one sort of lignin and/or at least one lignin derivative being present in particulate form and the cross-sectional area of the particles having a round, approximately round, circular, approximately circular, elliptical or approximately elliptical geometry.

There is thereby understood by a lignin derivative, a chemically modified lignin in which in particular free hydroxyl groups are chemically modified.

It is hence crucial in the present invention that the lignin or lignin derivative used as filler is present in particulate form, the lignin- or lignin-derivative particles having a specific geometry. The geometry of these particles is described, according to the present invention, with reference to the cross-sectional area in any direction and at any point through the particles, the cross-sectional area is round, circular or elliptical, according to the invention, or has a geometry which appears to approximate to these ideal geometric bodies. There are thereby understood by approximately round or circular or elliptical, those which come as close as possible to the ideal underlying geometric bodies. Approximately circular or elliptical forms can be characterised for example by certain deviations from this ideal shape being observable, such as for example dents or bulges in the particles.

Surprisingly, it was established that, as a result of the microstructuring according to the invention of the composite material, even with very high lignin- or lignin-derivative contents (e.g. 50% by mass), the mechanical properties, such as e.g. strength, rigidity and impact strength of the non-reinforced matrix are not only preserved but surprisingly significantly exceeded. The property gain in particular in strength and impact strength despite high lignin contents is only possible if a specific composite structure and sufficiently good adhesion between matrix and filler are set. The microstructured composite material according to the invention shows 36 times higher impact strengths and 10 times higher notch impact strengths relative to the standard material and remains furthermore thermoplastically deformable and hence processable with all current plastic material processing technologies (extrusion, injection moulding, spinning).

The use of lignin/lignin derivatives as low-cost filler and polymer substituent which, in addition, is inexhaustibly available as renewable raw material contributes in addition to reducing the overall material costs significantly.

There is thereby understood by an elliptical or approximately elliptical geometry, in particular that the ratio of the main axis to the subsidiary axis of a corresponding ellipse is at most 10, preferably more than 1 and up to at most 5.

According to a preferred embodiment, composite material according to one of the preceding claims is characterised in that the arithmetic average or the average diameter $d_{50}$ of a representative number of particles (at least 200) is less than 5 μm, preferably of 0.05 to 5 μm, further preferred of 0.1 to 2 μm, particularly preferred of 0.1 to 1.5 μm.

The above-mentioned average particle diameters are thereby determined as follows:

A moulded part or the granulate of the microstructured composite material according to the invention is cut by means of a sharp blade (microtome) (cut part). The exposed, smooth cut surface is photographed by means of a microscope (scanning electron- or light microscope). The images then show the two-phase system which consists of continuous matrix and particulate lignin. By means of image analysis software (analysis), the diameters of the cut surfaces of the lignin particles are measured by hand or automatedly. For better contrasting of matrix and lignin particles, the lignin phase can be dissolved out selectively by aqueous sodium hydroxide. The resulting cavities reproduce the size and shape of the lignin particles exactly and can be measured with respect to their diameter. At least 200, preferably 600, particles are measured with respect to the diameter and the determined values according to DIN ISO 9276-1 are represented in a frequency distribution. From this distribution, the relevant characteristic values of the arithmetical average particle diameter $d_{arith}$ and of the average particle diameter $d_{50}$ are determined corresponding to the DIN ISO 9276-2 standard.

For further preference, the distribution of the diameters is relatively homogeneous. For preference, the relative standard deviation of the average diameter or equivalent diameter of the particles around the average is less than 100%.

The total content of the lignin or lignin derivative can thereby be varied over a wide range. Preferred total contents of the lignin or lignin derivative are thereby, relative to the overall composite material, of 1 to 99% by weight, preferably of 10 to 80% by weight, particularly preferred of 20 to 60% by weight.

The at least one lignin or the lignin forming the basis of the at least one lignin derivative can originate from a coniferous wood-, deciduous wood-, hardwood-, softwood- or annual plant source and/or have been obtained by the kraft process, the organosolv process, the sulphite process or by fermentation. The last-mentioned processes are methods for lignin production which are generally known in the literature.

Preferred lignin derivatives can be obtained by partial or complete derivatisation, selected from the group consisting of esterification, etherification, urethanisation or a combination of the previously mentioned derivatisations of the hydroxyl groups of a corresponding lignin.

The derivatisation degree, relative to the number of OH groups, can thereby be between 0.1 and 100%, preferably of 0.1 to 95%.

The substituents of the derivatives, i.e. the radicals of the derivatisation reagents, with the exception of the crosslinking group to the lignin, can preferably be selected from aliphatic, olefinic and/or aromatic compounds which can comprise heteroatoms, in particular oxygen, nitrogen, sulphur and/or phosphorus.

Further advantageously, the composite material can comprise at least one adhesive, preferably in a quantity of 0.1 to 40% by weight, further preferred of 1 to 10% by weight, in particular of 1 to 3% by weight.

Preferred adhesives are thereby selected from the group consisting of diisocyanates; polymers or copolymers grafted with maleic anhydride, in particular polyethylene, polypropylene, polystyrene, polyisobutene, polyethylene co-vinyl acetate or polyethylene co-octane and also mixtures or combinations hereof, grafted with maleic anhydride, preferably the grafting degree of the polymers or copolymers grafted with maleic anhydride being of 0.0001 to 90%, further preferred of 0.1 to 10%, particularly preferred of 3 to 8%.

The adhesive can thereby be bonded covalently to the particles, in particular via at least one ester-, ether-, amide-, amine-, urethane- or siloxane bond and/or by semivalent bonds, in particular hydrogen bridge bonds.

Preferably, the adhesive has a number-averaged molecular weight of 100 to 500,000 g/mol, preferably of 500 and 50,000 g/mol, particularly preferred of 1,000 and 10,000 g/mol.

In addition, the composite material can comprise one or more additives, the additive or additives being selected preferably from the group consisting of olfactory substances, substances for minimising olfactory emissions, pigments, colourants, UV- and/or light stabilisers, flame retardants, preservatives, antioxidants, natural fibres and/or synthetic fibres.

Preferred thermoplastic matrix polymers are selected from the group consisting of polyamides, composite material according to one of the preceding claims, characterised in that the thermoplastic matrix polymer is selected from the group consisting of polyamides, in particular polyamide 11, 12, 6, 66, 6.10, 10.10, 10.12, 4.6, 6.12, 12.12, 6.9; polyesters, in particular PET, PLA, PHB, PBSA; polyethers; cellulose or cellulose derivatives; PVC, PVA, vinyl copolymers, polyolefins, in particular PE, PP, polybutadiene, polybutylene; polyurethanes; polycarbonates; polyalkylene glycols, in particular PEG; polyvinylpyridine; poly(meth)acrylates, in particular PMMA; polyvinyl alcohols; polyanilines and also combinations or blends of the previously mentioned polymers.

The present invention likewise relates to a method for the production of a previously described microstructured composite material. The method according to the invention can thereby be implemented in two preferred, however equivalent, variants.

According to a first variant of the method according to the invention, at least one sort of lignin and/or at least one lignin derivative is incorporated in a matrix, comprising at least one sort of a thermoplastic plastic material, at temperatures above the glass transition temperature of the at least one sort of lignin so that, after incorporation, the at least one sort of lignin and/or at least one lignin derivative is present in particulate form and the cross-sectional area of the particles has a round, approximately round, circular, approximately circular, elliptical or approximately elliptical geometry.

According to this variant of the method control, the geometry according to the invention of the particles of lignin or lignin derivatives are adjusted during incorporation of the lignins or derivatives hereof in the thermoplastic matrix. According to the invention, a temperature is thereby set, which is above the glass deformation point of the respectively used lignin or lignin derivative. If a mixture of lignins or lignin derivatives is used in which the individual sorts of lignins and/or lignin derivatives have different glass transition temperatures, a temperature is chosen which lies above the highest glass transition temperature of the respective lignins or derivatives hereof. Hence, it is ensured that, when incorporating the lignins or derivatives, these are present in the thermoplastic state so that, during incorporation in which normally shear forces arise, deformation of the respective original lignin particles or division into small droplets etc. is effected which, after conclusion of the process, i.e. after cooling the obtained thermoplastic composite material, are present in the matrix with the geometry according to the invention.

A second variant of the method according to the invention provides that at least one sort of lignin and/or at least one lignin derivative is present in particulate form and the cross-sectional area of the particles has a round, approximately round, circular, approximately circular, elliptical or approximately elliptical geometry and the at least one sort of lignin and/or at least one lignin derivative is incorporated in a matrix, comprising at least one sort of a thermoplastic plastic material.

Corresponding lignin particles or derivative particles with the prescribed geometry can be obtained in fact from the already previously mentioned methods, for example from the kraft process known from the literature, the organosolv process or by fermentation.

For preference, incorporation of the particles in the matrix is effected by means of kneading and/or extrusion in the melt, by means of physical mixing processes (as solid bodies) and the shaping subsequently by thermoforming/pressing/sintering and/or at processing temperatures of 50 to 400° C., preferably of 100 and 300° C., particularly preferred of 150 to 250° C.

The invention likewise relates to a moulded article, granulate or a master batch comprising or formed from a microstructured composite material as described previously.

The moulded articles can thereby be produced in any way, for example by extrusion, injection moulding, pressing, sintering, calendering, film-blowing, melt-spinning, compression moulding and/or thermoforming, for components in automobile construction, transport and/or communications, components for industrial equipment, machine- and plant construction, household appliances, containers, components for electrics or electronics. Hence, the invention likewise relates to the use of a composite material according to the invention for the previously mentioned purposes.

The invention is explained in more detail with reference to the subsequent examples without restricting the invention to the specially represented parameters.

EXAMPLE 1

Adjusting the Microstructuring of the Lignin Particles During Compounding

Polyethylene, adhesive (HV) and 50% by mass of dried lignin (pulverulent substrate obtained by the kraft process) were metered in succession into the kneading chamber of a preheated internal mixer (W 350 of the Brabender company) and mixed together for a defined time. With a virtually identical formulation, 6 materials were compounded, the processing regime being varied. Compounds produced in this way were processed to form granulate in a plastic material mill after removal from the kneading chamber and subsequently were processed in a piston injection moulding machine to form standard test pieces according to DIN EN ISO 527. Selected mechanical properties are compiled in Table 1. With a reducing particle diameter, the composite strength increases moderately, the impact strength or notch impact strength even sharply. The microstructuring of the composites according to the invention with sufficiently small lignin particles was achieved by using processing temperatures T above the glass transition temperature of the used lignin ($T_g$=160° C.). For the samples (Table 1) 4-7, the processing temperature was T=170° C. In order to disperse the lignin particles adequately, the mixing time of sample 4 to sample 7 was increased systematically.

The above-mentioned problem is hence solved according to the invention in that a specific composite structure, i.e. size and shape of the lignin particles, is adjusted in the polymer matrix. Adjustment of the shape and size of the lignin particles is achieved according to the invention by a special compounding process (see examples). Surprisingly, the processing parameters can be adjusted according to the invention such that the introduction of temperature and shear energy with interaction of a suitable adhesive (HV) and also the percentage proportion thereof of the overall formulation determine the structure, i.e. the microstructure according to the invention is achieved. By applying suitable processing conditions and formulations, different particle sizes or interparticulate spacings could be adjusted. A second solution path according to the invention resides in using lignin

TABLE 1

Compilation and quantification of structural parameters which characterise the lignin filler bonded in the thermoplastic matrix, and the mechanical properties corresponding to the microstructured composites, produced according to adjustment of the microstructuring during the compounding.

| | Sample No. | 1 | 2 | 3 | 4 | 5 | 6 | 7 |
|---|---|---|---|---|---|---|---|---|
| Property | Processing regime | PE | 116<br>PE + 50% lignin | 117 | 187 | 204<br>PE + 50% lignin + HV | 189 | 207 |
| Structure (Lignin) | particle shape (cross-sectional area) | — | undefined/ polygonal | undefined/ polygonal | round/ elliptical | round/ elliptical | round/ elliptical | round/ elliptical |
| | particle diameter average $d_{arith}$ [μm] | — | >6.50 | 6.37 | 1.13 | 0.81 | 0.76 | <0.76 |
| | median $d_{50}$ [μm] | — | | 4.74 | 0.88 | 0.75 | 0.75 | k.A. |
| | average particle spacing [μm] | | | — | 0.55 | 0.33 | k.A. | k.A. |
| Mechanics (composite) | tensile strength [MPa] | 25.9 | 16.2 | 26.2 | 34.0 | 35.5 | 33.5 | 35.5 |
| | modulus of elasticity [GPa] | 1.20 | 2.18 | 2.10 | 2.20 | 2.17 | 2.00 | 2.10 |
| | notch impact strength Charpy [kJ/m$^2$] | 6.4 | 0.9 | 1.0 | 2.0 | 3.5 | 5.0 | 7.9 |
| | impact strength Charpy kJ/m$^2$] | 38 (n.b) | 1.8 | 7.2 | 28 | 63 (n.b) | 64 (n.b.) | 64 (n.b.) | n.b not broken,
k.A. no data

It is evident from the above Table that the specially additivated composites (sample numbers 4, 5, 6 and 7), non-additivated (sample no. 1) or lignin-additivated, but with undefined or polygonal geometry of the particles (sample number 2 and 3) have significantly superior properties. This is evident in particular in the tensile strength, the notch impact strength and also the impact strength which can be recognised by a significant sharp increase in these properties.

Figure 1B:
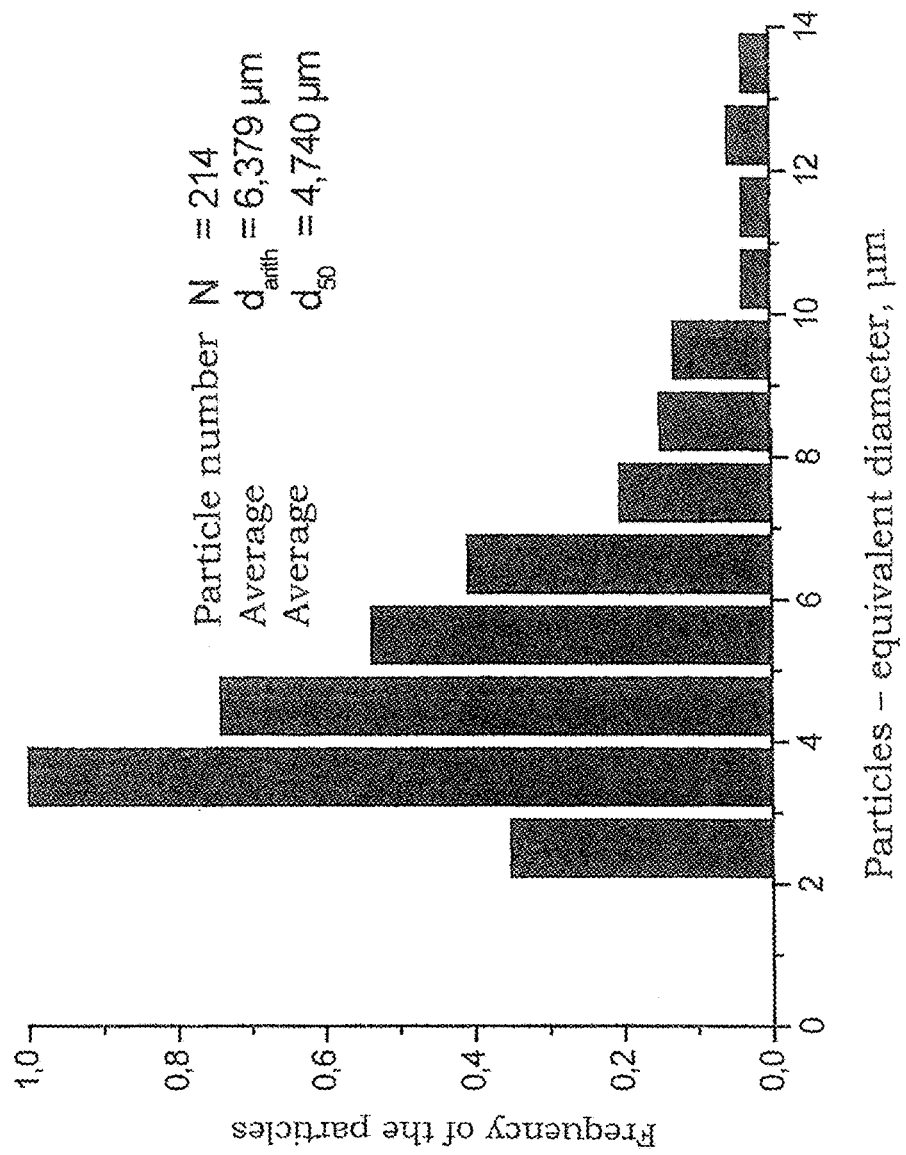
Figure 2A:
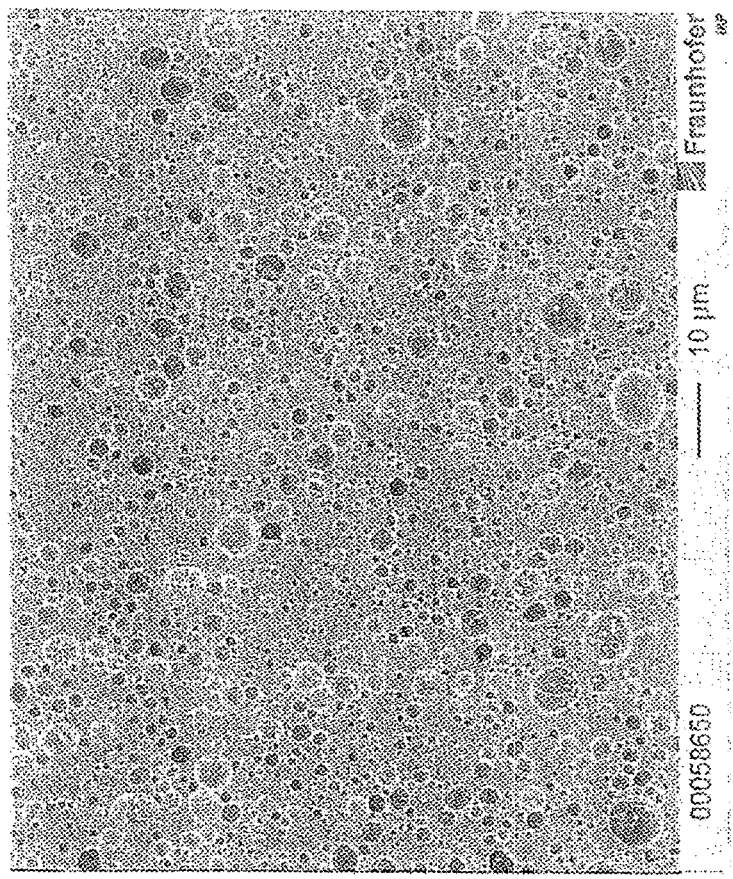
FIG. 2a is a scanning electron microscopic image of the cross-section of a composite material consisting of polyethylene, adhesive and 50% lignin.
Figure 2B:
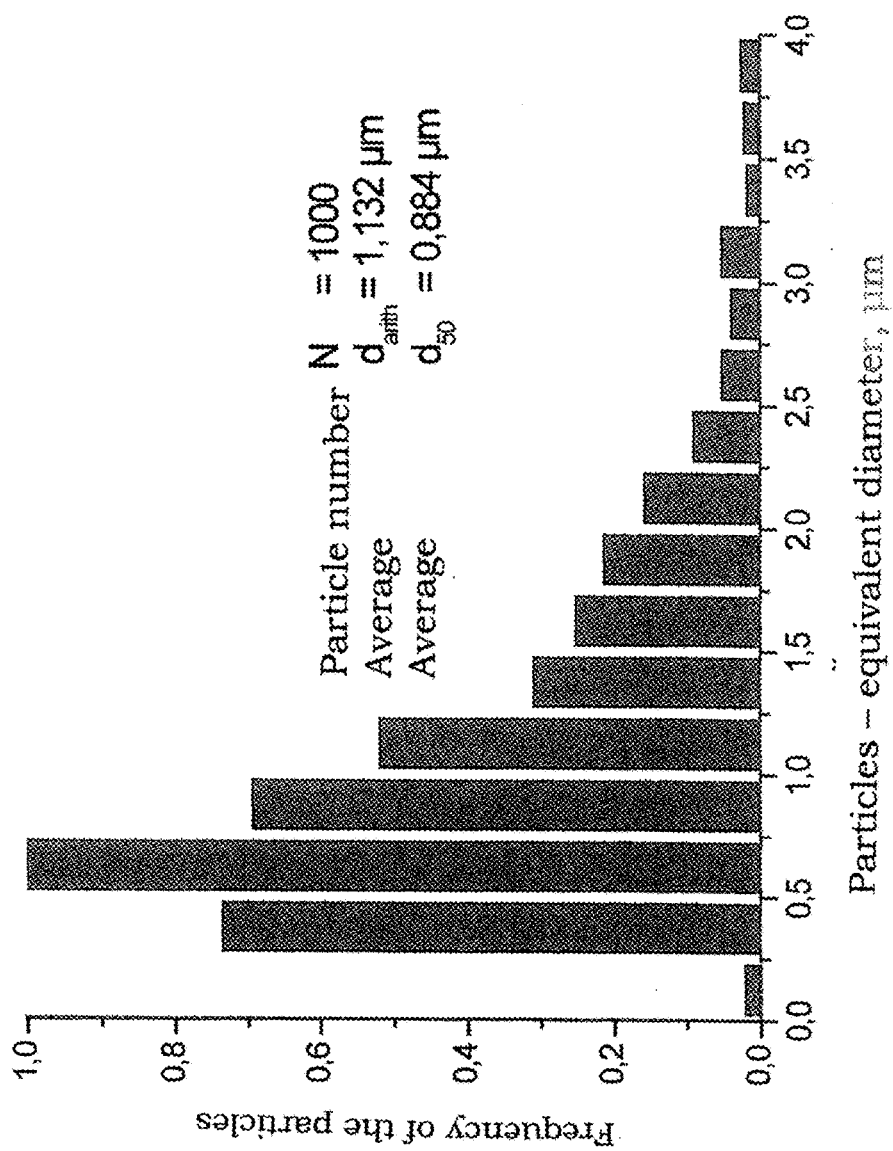
Figure 3A:
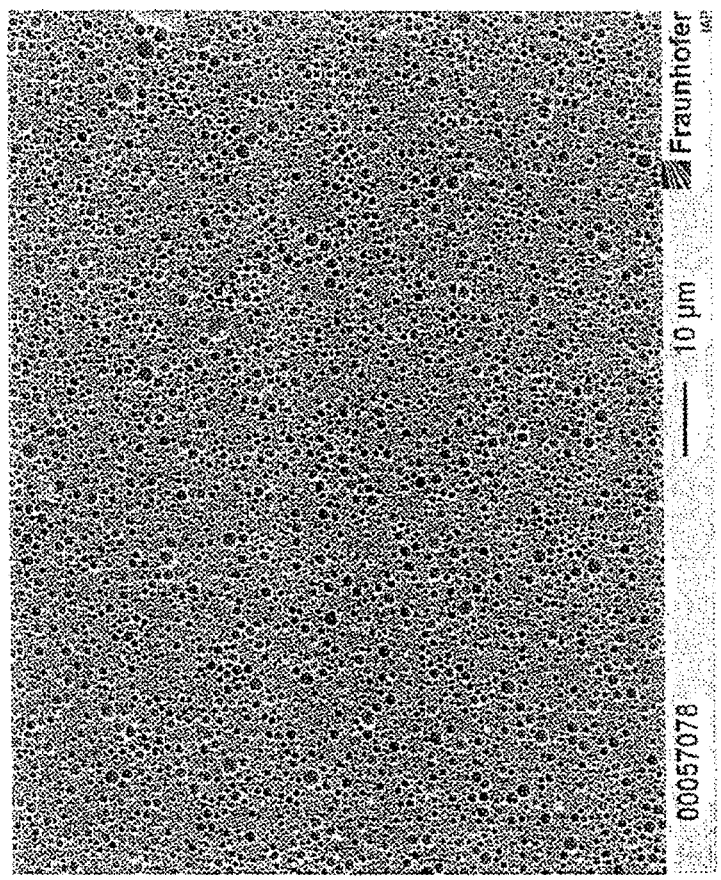
FIG. 3a is a scanning electron microscopic image of the cross-section of a composite material consisting of polyethylene, adhesive and 50% lignin.

The subsequently represented FIGS. 1a, 2a and 3a are thereby scanning electron microscopic images of the cross-section of a composite material, consisting of PE, adhesive and 50% lignin according to the samples with numbers 3 (FIG. 1), 4 (FIG. 2) and also 5 (FIG. 3). In order to visualise or to contrast the lignin particles, they were dissolved out of the matrix polymer for the scanning electron microscopic image, as a result of which cavities were produced in the composite, which particles reproduce exactly the shape and size of the lignin particles. A representative number of these cavities was measured, illustrated graphically in a histogram (respectively FIG. B) and, from the distribution curve, the characteristic values, the average of the particle sizes and also the median were determined. It is detectable from the table that, with decreasing average diameter of the lignin particles and also with specific geometry, the mechanical properties increase significantly or even sharply.

particles in a compound, which particles have the desired structural properties even before compounding. Surprisingly, the particle size of the lignin influences the properties of the composite material considerably. It was thereby able to be found that particles with a smaller diameter, with the condition of a circular or elliptical cross-sectional area, have a clearly positive effect on the composite properties, in particular the impact strength. The microstructured composite material no. 7 according to the invention shows 36 times higher impact strengths and 10 times higher notch impact strengths compared with standard material no. 2 (Table 1).

EXAMPLE 2

Preparation of Lignin Particles with the Geometry According to the Invention

The starting product is the black lye occurring during the lignin isolation (from deciduous wood, coniferous wood, annual plants) by means of kraft-, organosolv-, sulphite processes, in which lignin is present in dissolved form. By lowering the pH value (pH<7) of the black lye, lignin is precipitated in particulate form. By nucleation of this black lye with micro- or nanoscale organic or inorganic particles and/or by lowering the pH value to the highly acidic range (pH<4), sufficiently small lignin particles can be generated. These can in turn be further comminuted by a grinding process and fractionated by sieving. The ground and fractionated lignin particles can be subjected furthermore to a heat treatment (T>$T_{g,\ lignin}$) in order that a round, spherical or ellipsoidal shape can be produced. Lignin particles produced according to this procedure then have a geometry (size and shape) which has an advantageous effect on the reinforcement of thermoplastic materials, in the sense of the invention. The lignin particles illustrated according to example 2 hence had in fact the geometry essential to the invention and can subsequently be subjected to a derivatisation or be incorporated directly in a thermoplastic matrix.

The invention claimed is:

1. A microstructured composite material comprising
   a) a matrix comprising at least one thermoplastic plastic material, and
   b) distributed homogeneously in the matrix, at least one lignin and/or at least one lignin derivative,
   wherein the total content of the at least one lignin and/or of the at least one lignin derivative is, relative to the overall composite material, of 1 to 80% by weight,
   wherein the at least one lignin or the lignin forming the basis of the at least one lignin derivative originates from a coniferous wood-, deciduous wood- or annual plant source,
   wherein the at least one lignin derivative is obtained by partial or complete derivatisation, selected from the group consisting of esterification, etherification, urethanisation, and a combination thereof, of the hydroxyl groups of a corresponding lignin,
   wherein the at least one lignin and/or at least one lignin derivative is present in particulate form and the cross-sectional area of the particles has a round, approximately round, circular, approximately circular, elliptical or approximately elliptical geometry,
   wherein 50% of the particles of a representative number of particles (at least 200) have a diameter ($d_{50}$, median) less than 5 µm as determined according to the DIN ISO 9276-2 standard, and
   wherein at least one adhesive is contained.

2. The composite material according to claim 1, wherein, in the case of the elliptical or approximately elliptical geometry, the ratio of the main axis to the subsidiary axis is at most 10.

3. The composite material according to claim 1, wherein the arithmetic average diameter of a representative number of particles (at least 200) is less than 5 µm, and 50% of the particles of a representative number of particles (at least 200) have a diameter ($d_{50}$, median) of 0.05 to 5 µm.

4. The composite material according to claim 1, wherein the total content of the at least one lignin and/or of the at least one lignin derivative is, relative to the overall composite material, of 10 to 80% by weight.

5. The composite material according to claim 1, wherein the derivatisation degree, relative to the number of OH groups, is between 0.1 and 100%.

6. The composite material according to claim 1, wherein substituents of the derivatives are selected from the group consisting of aliphatic, olefinic and/or aromatic compounds which optionally comprise one or more heteroatoms.

7. The composite material according to claim 1, wherein the adhesive is contained in a quantity of 0.1 to 40% by weight.

8. The composite material according to the claim 7, wherein the at least one adhesive is selected from the group consisting of diisocyanates, polymers or copolymers grafted with maleic anhydride, polyethylene, polypropylene, polystyrene, polyisobutene, polyethylene co-vinyl acetate, polyethylene co-octane, and mixtures or combinations thereof, and grafted with maleic anhydride, the grafting degree of the polymers or copolymers grafted with maleic anhydride being of 0.0001 to 90%.

9. The composite material according to claim 7, wherein the adhesive is bonded covalently to the particles.

10. The composite material according to claim 7, wherein the number-averaged molecular weight of the adhesive is of 100 to 500,000 g/mol.

11. The composite material according to claim 1, further containing additives selected from the group consisting of olfactory substances, substances for minimising olfactory emissions, pigments, colourants, UV- and/or light stabilisers, flame retardants, preservatives, antioxidants, natural fibres, and synthetic fibres.

12. The composite material according to claim 1, wherein the thermoplastic plastic material of the matrix is selected from the group consisting of polyamides, polyesters, polyethers, cellulose or cellulose derivatives, polyvinyl chloride (PVC), polyvinyl alcohol (PVA), vinyl copolymers, polyolefins, polyurethanes, polycarbonates, polyalkylene glycols, polyvinylpyridine, poly(meth)acrylates, polyvinyl alcohols, polyanilines, and combinations or blends thereof.

13. A method for the production of a microstructured composite material according to claim 1, in which
   a) at least one lignin and/or at least one lignin derivative is incorporated in a matrix comprising at least one thermoplastic plastic material, at temperatures above the glass transition temperature of the at least one lignin so that, after incorporation, the at least one lignin and/or at least one lignin derivative is present in particulate form and the cross-sectional area of the particles has a round, approximately round, circular, approximately circular, elliptical or approximately elliptical geometry, or
   b) at least one lignin and/or at least one lignin derivative is present in particulate form and the cross-sectional area of the particles has a round, approximately round, circular, approximately circular, elliptical or approximately elliptical geometry and the at least one lignin and/or at least one lignin derivative is incorporated in a matrix, comprising at least one thermoplastic plastic material.

14. The method according to claim 13, wherein the at least one lignin and/or the at least one lignin derivative is incorporated into the matrix
   a) by kneading and/or extrusion in the melt, and/or
   b) processing at temperatures of 50 to 400° C. and/or
   c) by means of physical mixing processes and the shaping subsequently by thermoforming/pressing/sintering.

15. A moulded article, granulate or master batch comprising or formed from a microstructured composite material according to claim 1.

16. A method for producing a moulded part by extrusion, injection moulding, pressing, sintering, calendaring, film-blowing, melt-spinning, compression moulding and/or thermoforming; for components in automobile construction, transport and/or communications; components for industrial equipment, machine- and plant construction; household appliances; containers; components for electrics or electronics; said method comprising utilizing the microstructured composite material according to claim 1 in the production.

17. The composite material according to claim 7, wherein the adhesive is bonded covalently to the particles via at least one ester-, ether-, amide-, amine-, urethane- or siloxane bond and/or by semivalent bonds.

18. The composite material according to claim 1, wherein the thermoplastic plastic material of the matrix is selected from the group consisting of polyamides PA11, 12, 6, 66, 6.10, 10.10, 10.12, 4.6, 6.12, 12.12, and 6.9; polyesters polyethylene terephthalate (PET); polylactic acid (PLA); polyhydroxybutyrate (PHB); poly(butylene-succinate-co-adipate) (PBSA); polyethers; cellulose or cellulose derivatives; polyvinyl chloride (PVC); polyvinyl alcohol (PVA); vinyl copolymers; polyolefins polyethylene (PE); polypropylene (PP); polybutadiene; and polybutylene; polyurethanes; polycarbonates; polyethylene glycol; polyvinylpyridine; poly(meth)acrylate; and blends thereof.

* * * * *